Jan. 17, 1967     H. G. SMITH     3,298,242

STEERING WHEEL LOCK

Filed Aug. 26, 1964

INVENTOR

HOBART G. SMITH

BY Semmes & Semmes

ATTORNEYS

United States Patent Office 3,298,242
Patented Jan. 17, 1967

3,298,242
STEERING WHEEL LOCK
Hobart G. Smith, 3351 Midway St.,
Knoxville, Tenn. 37921
Filed Aug. 26, 1964, Ser. No. 392,146
13 Claims. (Cl. 74—495)

This invention concerns a device for locking a wheel in a fixed position. More precisely, the disclosure reveals a lock for fixing a steering wheel of a vehicle when towing the vehicle upon its turnable wheels.

In craning, hoisting, winching or towing a vehicle from a point adjacent its fixed wheels, it is necessary to clamp its turnable wheels so that they will not pivot to one side or fishtail. Before hoisting the rear of an automobile on a wrecker, it has been necessary to lash a segment of its steering wheel to a window post, but tying has been unsatisfactory for many reasons. Anchoring a cord is sometimes disfiguring to an automobile. Rope is flexible, which allows a wheel to turn slightly and causes a towed automobile to swerve. If a radial post of a steering wheel is not immediately adjacent a window post, the steering wheel may slide through the rope, allowing the wheel to turn. Thus, the rope tying method has engendered both danger and inconvenience.

Disadvantages inherent in the old tying method are overcome by the present invention. The new device is easy to attach and positively clamps a steering wheel against rotation. Moreover, its configuration insures that it will do no damage to an automobile. Since almost all vehicles have a seat adjacent the steering wheel, the novel lock is useful on all types of vehicles, closed as well as open, the latter of which additionally have no fixture to which a steering wheel can be conveniently lashed.

The invention uses commonly available materials to uniquely interconnect novel anchors and clamps. The complete clamp consists in a seat frame anchor, a steering wheel clamp, a self-locking seat belt-type buckle, and a length of webbed belt having a pull ring.

Accordingly, it is an object of this invention to provide a steering wheel clamping device.

This invention contributes a clamp for rigidly interconnecting a segment of a steering wheel with a fixed object on a vehicle.

A third objective is the provision of apparatus to clamp a steering wheel in fixed relation to a vehicle's seat.

This invention has as another objective the provision of a driver's seat-anchored steering wheel lock for a vehicle to be towed.

Further objects of this invention will be apparent from the following specification and from drawings in which.

Figure 1:
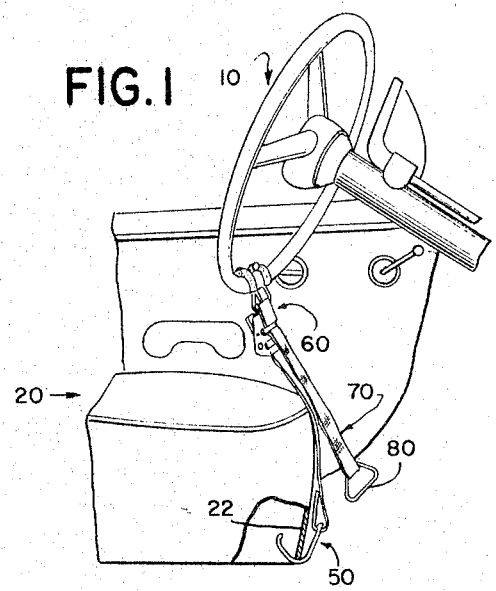
FIGURE 1 is an elevation of a steering wheel lock applied between a driver's seat and steering wheel of a vehicle.

Referring to FIGURE 1, a steering wheel is generally indicated by the numeral 10. 20 designates a driver's seat of an automobile or other vehicle. Tines of clamp 30 surround steering wheel 10. A clearance exists between frame 22 of seat 20 and the floor of the vehicle. Anchor 50 fits in that clearance and underlies and engages frame 22. Buckle 60 is mounted to hook 30, and web belt 70, having one end secured to anchor 50, passes through unidirectional buckle 60. Pull ring 80 provides a convenient grasp to tighten belt 70 and, consequently, the entire clamp.

Figure 2:
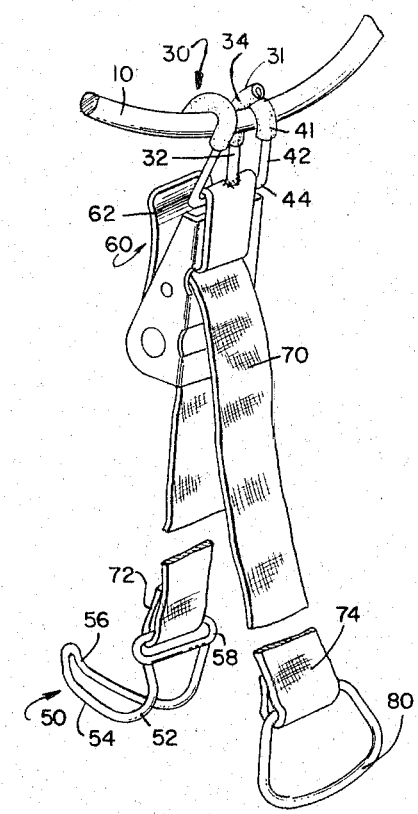
FIGURE 2 is a perspective view of assembled lock elements.

In FIGURE 2 it can be seen that clamp 30 may be constructed of four interjoined elements. Stationary tine 32 is slightly bent at its remote end 34. A tubular hinge 36 is welded 35 to the base of tine 32, and a flat projection 38 is welded 37 to the opposite side of hinge 36, providing a mounting for buckle 50. A complementary pair of hooks comprise a bar 42 internally rotated in the tubular hinge 36. Adjacent opposite ends of hinge 36, bar 42 is bent at acute angles 44. Opposite remote ends of the bar 42 are curvedly bent to partially surround steering wheel 10. Resilient tubes 31 and 41 which may be rubber hose enclose the curved ends 34 and 46 of the respective tines 32 and 42, enhancing the locking of steering wheel 10 and preventing its marring.

Seat support frame anchor 50 comprises a rod reentrantly bent to form vertical risers 52, horizontal extensions 42, which project under the seat, and U-shaped end 56, which is bent upward. The upper ends of vertical portions 52 are welded to a flattened ring which engages loop 72 stitched in one end of web belt 70.

Figure 3:
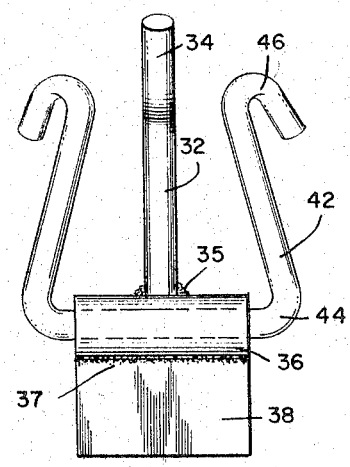
FIGURE 3 is a front elevation of the steering wheel clamp.
Figure 4:
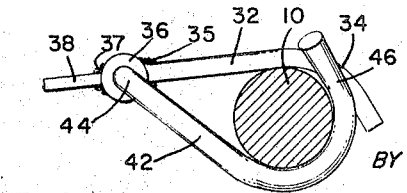
FIGURE 4 is a side elevation of the clamp.

FIGURES 3 and 4 are elevations of the novel clamp 30, which comprises a portion of the steering wheel lock. From these drawings, it may be seen that fixed tine 32, hinge 36, and plate 38 are rigidly welded at 35 and 37. The cooperating tines of bar 42 are bent inwardly at an angle of approximately 75° to correspond with radii of a steering wheel. Opposite remote ends 46 of tines are curved outwardly to further enhance the clamping action of the hook. Curved ends 46 engage steering wheel 10, and as belt 70 and buckle 60 draw plate 38 away from the steering wheel, hinge 36 pulls tines 42. When the hinge is as far as possible from the steering wheel, further pulling upon plate 38 tends to align tines 42 with the plate, which forces tine 32 to squeeze the wheel against complementary tines 42. The result is that wheel 10 is firmly held between the tines and cannot slide therethrough.

In operation, lifting spring lever 62 and belt 70 is forced through buckle 60 until the pull ring 80 abuts the buckle. After the steering wheel has been turned to align vehicle wheels in a position desired, the lowermost segment of tines 42 are placed over the steering wheel opposing tine 32. Anchor 50 is slid under a portion of seat 20 in line with the steering wheel column, until risers 52 rest against the seat, and horizontal extensions 54 of anchor 50 engage frame 22 of the seat. A firm pull on ring 80 clamps the steering wheel in a locked position. Since belt 70 stretched over the forward portion of automobile seat 20, deformation of the seat results in a continuous positive pull on belt 70, insuring that wheel 10 never slides through hook 30.

Although the novel hooks and clamp described herein have been presented by specific example, it will be obvious to one skilled in the art that application of the inventive features may take several forms. Consequently, the invention is not limited to the embodiment described in the drawings; the scope of the invention is precisely defined only in the appended claims.

I claim:

1. An apparatus for locking an automobile steering wheel for use when towing an automobile from the rear, which comprises:
   (A) an anchor mounted to said automobile;
   (B) a steering wheel clamp partially surrounding a segment of a steering wheel;
   (C) a belt and buckle combination interconnecting said anchor and said steering clamp, one end of said belt being connected to said anchor, the remaining end of said belt extending through said buckle; said buckle being connected to said steering wheel clamp, said buckle comprising means to urge said anchor and said clamp toward each other and secure the steering wheel in locked position to prevent it from moving, when said remaining end of said belt is pulled away from said buckle.

2. An apparatus for locking an automobile steering wheel for use when towing an automobile from the rear, which comprises:
   (A) a seat frame anchor, engaging the underside of a driver's seat;
   (B) a steering wheel clamp partially surrounding a segment of a steering wheel;
   (C) a belt and buckle combination interconnecting said anchor and said steering clamp, one end of said belt being connected to said anchor, the remaining end of said belt extending through said buckle; said buckle being connected to said steering wheel clamp, said buckle comprising means to urge said anchor and said clamp toward each other and secure the steering wheel in locked position to prevent it from moving, when said remaining end of said belt is pulled away from said buckle.

3. The apparatus of claim 2, wherein said clamp comprises:
   (B1) a first curved tine;
   (B2) a plurality of oppositely curved complementary tines;
   (B3) a hinge interconnecting said tines, and
   (B4) a projection from said hinge interconnecting said clamp with said buckle.

4. The apparatus of claim 3 wherein said first tine, said hinge and said projection are integrally joined, said complementary tines are pivoted in said hinge, and ends of said complementary tines remote from said hinge define curves of greater than 90 degrees.

5. The apparatus of claim 3, wherein said complementary tines comprise a single body, having a central portion passing through said hinge, said body being bent at opposite ends of said central portions to define angles lying in a first plane, the extreme opposite ends of said body defining curves of greater than 90 degrees.

6. The apparatus of claim 5 wherein said curves lie in divergent planes.

7. The apparatus of claim 2 in which said buckle comprises a unidirectional engaging automobile seat belt buckle.

8. The apparatus of claim 2, wherein said belt comprises a 21-inch length of 2-inch safety seat belt webbing.

9. The apparatus as described in claim 2, wherein said buckle further comprises second means to release said steering wheel clamp from the locked position.

10. The apparatus as described in claim 9, wherein said second means comprises spring means frictionally engaging said belt.

11. In an automobile steering wheel lock, an improvement of a steering wheel clamp comprising:
   (A) a first bent tine overlying a segment of a steering wheel;
   (B) a tubular hinge, having one side thereof fixed to said tine;
   (C) an anchor projection fixed to an opposite side of said hinge;
   (D) a bar having:
      (D1) a central portion thereof passing through said hinge, said bar being bent adjacent opposite ends of said hinge, thereby forming;
      (D2) complementary tines generally aligned with extended radii of a steering wheel, extreme end portions of said tines overlying said wheel segment oppositely of said first tine and being curved in mutually divergent planes through angles of greater than 90 degrees, thereby forming;
      (D3) hooks complementary in curvature with said first tine.

12. A clamp for a generally cylindrical body comprising:
   (A) a hinge;
   (B) a fixed tine affixed to one end of said hinge, said tine having a curved portion remote from said hinge, said curved portion overlying said body;
   (C) an anchor connected to the other end of said hinge;
   (D) a bar having:
      (D1) a central portion projecting through said hinge, said bar being bent at opposite ends of said central portion forming;
      (D2) two complementary tines, end portions of said complementary tines remote from said central portion overlying said body oppositely of said fixed tine and being curved through angles of greater than 90 degrees, thereby forming hooks;
whereby, when said hooks engage said body drawing said anchor away from said body tends to align said hooks, said hinge and said anchor, and said first tine resists alignment, thereby tending to squeeze said body between said first tine and said complementary tines.

13. Apparatus of claim 12 wherein said tines are coated with a resilient, high friction material.

References Cited by the Examiner

UNITED STATES PATENTS

| | | | |
|---|---|---|---|
| 2,531,675 | 11/1950 | Field | 74—495 |
| 2,625,837 | 1/1953 | Holmes | 74—495 |
| 3,138,036 | 6/1964 | Carson | 74—495 |

FRED C. MATTERN, JR., *Primary Examiner.*

J. PUFFER, *Assistant Examiner.*